US011711884B2

United States Patent
Wilkie et al.

(10) Patent No.: US 11,711,884 B2
(45) Date of Patent: Jul. 25, 2023

(54) PLASMA COMPRESSION DRIVER

(71) Applicant: GENERAL FUSION INC., Burnaby (CA)

(72) Inventors: James Hastings Wilkie, Vancouver (CA); Joerg Zimmermann, Vancouver (CA); Martin Clifford Wight, White Rock (CA); Cody John Pavel Esau, Vancouver (CA); Ivan Victorovich Khalzov, Coquitlam (CA)

(73) Assignee: General Fusion Inc., Richmond (CA)

( * ) Notice: Subject to any disclaimer, the term of this patent is extended or adjusted under 35 U.S.C. 154(b) by 0 days.

(21) Appl. No.: 17/756,405

(22) PCT Filed: Dec. 2, 2020

(86) PCT No.: PCT/CA2020/051655
§ 371 (c)(1),
(2) Date: May 24, 2022

(87) PCT Pub. No.: WO2021/108908
PCT Pub. Date: Jun. 10, 2021

(65) Prior Publication Data
US 2023/0003205 A1   Jan. 5, 2023

Related U.S. Application Data

(60) Provisional application No. 62/942,723, filed on Dec. 2, 2019.

(51) Int. Cl.
*H05H 1/24* (2006.01)
*F04B 37/18* (2006.01)
(Continued)

(52) U.S. Cl.
CPC ............... *H05H 1/24* (2013.01); *F04B 35/00* (2013.01); *F04B 37/18* (2013.01);
(Continued)

(58) Field of Classification Search
CPC ........ H05H 1/24; H05H 1/50; H05H 2245/20; F04B 35/00; F04B 37/18; F04B 39/0011; F04B 39/5314; F04B 39/162
(Continued)

(56) References Cited

U.S. PATENT DOCUMENTS

| 2006/0070590 A1* | 4/2006 | Jacobsen | ............... F02B 75/285 123/46 R |
| 2006/0159559 A1 | 7/2006 | Tessien | |
| 2006/0198483 A1* | 9/2006 | Laberge | .................. G21B 3/008 376/100 |

FOREIGN PATENT DOCUMENTS

| CA | 2984756 A1 | 8/2019 |
| CN | 101300654 A | 6/2011 |

(Continued)

OTHER PUBLICATIONS

International Search Report and Written Opinion of PCT/CA2020/051655, dated Mar. 8, 2021, in 6 pages.
(Continued)

*Primary Examiner* — Charles G Freay
(74) *Attorney, Agent, or Firm* — Knobbe, Martens, Olson & Bear, LLP

(57) ABSTRACT

A plasma compression driver is connected to a plasma containment vessel containing a liquid medium that forms a liquid liner containing plasma, and comprises a pair of coaxially aligned pistons that are sequentially driven towards the liquid liner. A pusher bore containing a pusher piston is coaxial with and has a smaller diameter than a driver bore containing a driver piston such that an interconnecting annular face surface is defined at the junction of the driver and pusher bores. During the compression operation, a prime mover accelerates the driver piston towards the pusher piston and compresses a compression fluid, which accelerates the pusher piston and pushes the liquid medium
(Continued)

in the pusher bore into the vessel, causing the liquid liner to collapse, and compressing the plasma. Outward forces on the vessel wall caused by compression driver recoil and increased vessel pressure is counteracted by an inward force applied by the compression fluid on the annular face surface during the compression operation.

30 Claims, 12 Drawing Sheets

(51) Int. Cl.
    *F04B 39/00*     (2006.01)
    *F04B 35/00*     (2006.01)
    *F04B 53/14*     (2006.01)
    *F04B 53/16*     (2006.01)
    *H05H 1/50*     (2006.01)

(52) U.S. Cl.
    CPC .......... *F04B 39/0011* (2013.01); *F04B 53/14* (2013.01); *F04B 53/162* (2013.01); *H05H 1/50* (2013.01); *H05H 2245/20* (2021.05)

(58) Field of Classification Search
    USPC ........................................................ 417/384
    See application file for complete search history.

(56) References Cited

FOREIGN PATENT DOCUMENTS

| | | |
|---|---|---|
| CN | 102301832 A | 7/2014 |
| CN | 104321540 A | 11/2016 |
| CN | 104604338 A | 6/2017 |
| CN | 107112053 A | 4/2019 |
| WO | WO2007/051778 A1 | 5/2007 |
| WO | WO2010/089670 A1 | 8/2010 |
| WO | WO2013/149345 * | 10/2013 |
| WO | WO2013/149345 A1 | 10/2013 |
| WO | WO2014/032186 A1 | 3/2014 |
| WO | WG2016/112464 A1 | 7/2016 |
| WO | WO2018094043 * | 5/2018 |
| WO | WO 2018094043 | 5/2018 |
| WO | WO 2018201226 | 11/2018 |

OTHER PUBLICATIONS

Office Action dated Aug. 23, 2022 for CN202080084440.3 in 6 pages.

* cited by examiner

PLASMA COMPRESSION DRIVER

TECHNICAL FIELD

The present disclosure generally relates to a driver used for compressing plasma.

BACKGROUND

Unless otherwise indicated herein, the materials described in this section are not prior art to the claims in this application and are not admitted to be prior art by inclusion in this section.

Plasma contained in a cavity within a liquid liner can be compressed by imploding the liquid liner. The implosion of the liquid liner can be driven by a compression driver. In some examples of known compression drivers, an implosion of the liquid liner is driven by a high pressure fluid (e.g. high pressure gas) that pushes on a piston which in turn pushes on a liquid medium fluidly communicative with the liquid liner. In one exemplary application, a plasma compression system comprises a vessel containing a liquid medium that is circulated to form a liquid liner defining a cavity in which plasma is injected. The vessel is connected to multiple compression drivers fluidly communicative with the liquid medium; each compression driver comprises a valve which opens to allow a high pressure gas from an accumulator to move through the valve and act upon a piston that pushes the liquid medium into the vessel to collapse the liquid liner.

In some applications, the plasma needs to be compressed within a very short time period, in the order of milliseconds. It follows that the compression operation must be performed over a similarly short time period, necessitating the pistons to move very quickly. In order to provide the required energy to collapse the liquid liner and compress the plasma, reducing the compression operation time requires a proportional increase in power. Providing sufficient power to compress plasma within a target time period can be challenging.

Additionally, the vessel can be subjected to extremely high outward stresses when the compression drivers push the liquid medium inwardly into the vessel, especially when the compression operation happens quickly, e.g. in the order of milliseconds. The outward stress is caused by two key forces: (1) a recoil force from the compression drivers as the driver piston accelerates, and (2) pressure build up in the liquid medium in front of the pistons. This second cause is particularly prevalent as the pistons pressurize the liquid medium to accelerate inwardly, the pressurized liquid medium pushes outwardly on the vessel.

In some applications, the vessel wall can experience pressures in the order of 65 MPa. Unless the outward pressure can be reduced, the vessel must be designed to withstand such pressures, which can be expensive and complex.

SUMMARY

In one aspect, a compression driver is provided for compressing plasma in a cavity defined by a liquid liner composed of a liquid medium contained in a vessel of a plasma compression system. The compression driver comprises: a driver bore with a driver piston slideable therein; a pusher bore with a pusher piston slideable therein and having a lower mass than the mass of the driver piston, the pusher bore having a distal end for communicating with the liquid medium in the vessel, a proximal end coupled to a distal end of the driver bore at a bore junction, and a length shorter than a length of the driver bore; a prime mover coupled to the driver bore and operable to move the driver piston along the driver bore; and a compressible compression fluid or magnetic field in between the driver and pusher pistons, wherein compression of the compression fluid or magnetic field by the driver piston moving towards the pusher piston applies pressure on the pusher piston, such that the pusher piston pushes the liquid medium into the vessel to collapse the liquid liner and compress the plasma.

The pusher bore can have a smaller diameter than a diameter of the driver bore, in which case the compression driver can further comprise an annular face surface interconnecting a proximal end of the pusher bore and a distal end of the driver bore at the bore junction, whereby compression of the compression fluid applies an inward pressure on the annular face surface which counteracts an outward pressure on the vessel.

The prime mover can comprise an accumulator containing a pressurized driver fluid and a driver fluid valve fluidly coupling the accumulator to the driver bore behind the driver piston. The driver fluid valve can be adjustable to adjust a pressure applied to the driver piston by the driver fluid. At least one venting port can be provided in the driver bore for venting the driver fluid or the compression fluid from the driver bore; the venting port comprises a venting valve adjustable to adjust a pressure applied to the driver piston by the driver fluid or the compression fluid. A compression fluid injection port can be provided in the driver bore in proximity to the junction and serve to inject the compression fluid into the driver bore ahead of the driver piston; the compression fluid injection port comprises a compression fluid injection valve adjustable to adjust a pressure applied to the driver piston by the compression fluid.

The driver piston can have a distal end comprising a frusto-conical protrusion and the pusher piston can have a proximal end comprising a frusto-conical receptacle configured to receive the distal end of the driver piston. The driver piston can further comprise a distal end having an annular ledge parallel to the annular face surface and an annular rim perpendicular to an adjacent the annular ledge, such that a compression fluid channel is formed by the annular rim, annular face surface and annular ledge when the driver piston is at the bore junction.

In another aspect, a plasma compression system is provided comprising: a plasma containment vessel comprising a liquid medium and a circulating mechanism to circulate the liquid medium and form a liquid liner with a cavity; a plasma generator fluidly communicative with the vessel and operable to inject a plasma into the cavity; and a compression driver connected to the vessel. The compression driver comprises: a driver bore with a driver piston slideable therein; a pusher bore with a pusher piston slideable therein and having a lower mass than the mass of the driver piston, the pusher bore having a distal end in fluid communication with the liquid medium, a proximal end coupled to a distal end of the driver bore at a bore junction, and a length shorter than a length of the driver bore; a prime mover coupled to the driver bore and operable to move the driver piston along the driver bore; and a compressible compression fluid or magnetic field in between the driver and pusher pistons, wherein compression of the compression fluid or magnetic field by the driver piston moving towards the pusher piston applies pressure on the pusher piston, such that the pusher piston pushes the liquid medium into the vessel to collapse the liquid liner and compress the plasma.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIGS. 3(A) and (B) are perspective sectioned views of a proximal end of the compression driver, wherein FIG. 3(A) shows a driver gas injection valve in a closed position and the driver piston in a start position, and FIG. 3(B) shows the valve in an opened position and the driver piston in a displaced position, wherein the driver piston is displaced by a driver gas flowing through the valve.

FIGS. 4(A), 4(B) and 4(C) are sectioned views of a junction of the driver and pusher bores of the compression driver, wherein FIG. 4(A) shows the driver piston approaching the pusher piston; FIG. 4(B) shows the driver and pusher pistons at the junction and FIG. 4C shows the driver piston at the junction and the pusher piston accelerating along the pusher bore away from the driver piston.

DETAILED DESCRIPTION OF SPECIFIC EMBODIMENTS

Embodiments described herein relate to a two-stage plasma compression driver that compresses plasma by imploding a liquid liner surrounding a cavity containing the plasma. The compression driver is connected to a plasma containment vessel containing a liquid medium that forms the liquid liner, and comprises a pair of coaxially aligned pistons that are sequentially driven towards the liquid liner. More particularly, the compression driver comprises a driver piston movable within a driver bore and a pusher piston movable within a pusher bore. The pusher bore has a distal end in fluid communication with the vessel and a proximal end connected to a distal end of the driver bore; a proximal end of the driver bore is coupled to a prime mover for driving the driver piston. The pusher bore is coaxial with and has a smaller diameter than the driver bore such that an interconnecting annular face surface is defined at the junction of the driver and pusher bores. At the start of a compression operation, the pusher piston is located at the driver and pusher bore junction, the driver piston is located at the proximal end of the driver bore, the pusher bore is filled with the liquid medium, and the driver bore between the driver and pusher pistons contains a compressible fluid ("compression fluid"). During the compression operation, the prime mover accelerates the driver piston towards the pusher piston and compresses the compression fluid. When the compression fluid pressure exceeds the liquid medium pressure acting against the pusher piston, the pusher piston is accelerated towards the distal end of the pusher bore, thereby pushing the liquid medium in the pusher bore into the vessel, causing the liquid liner to collapse, and compressing the plasma. The pusher bore has a shorter length relative to the length of the driver bore and the pusher piston has a lower mass relative to the mass of the driver piston, which effectively amplifies the power delivered by the pusher piston against the liquid medium. The outward forces on the vessel wall caused by compression driver recoil and increased vessel pressure are counteracted by an inward force applied by the compression fluid on the annular face surface during the compression operation. It is expected that this counteracting inward force will reduce the stress on the vessel wall caused by the plasma compression operation.

Figure 7A:
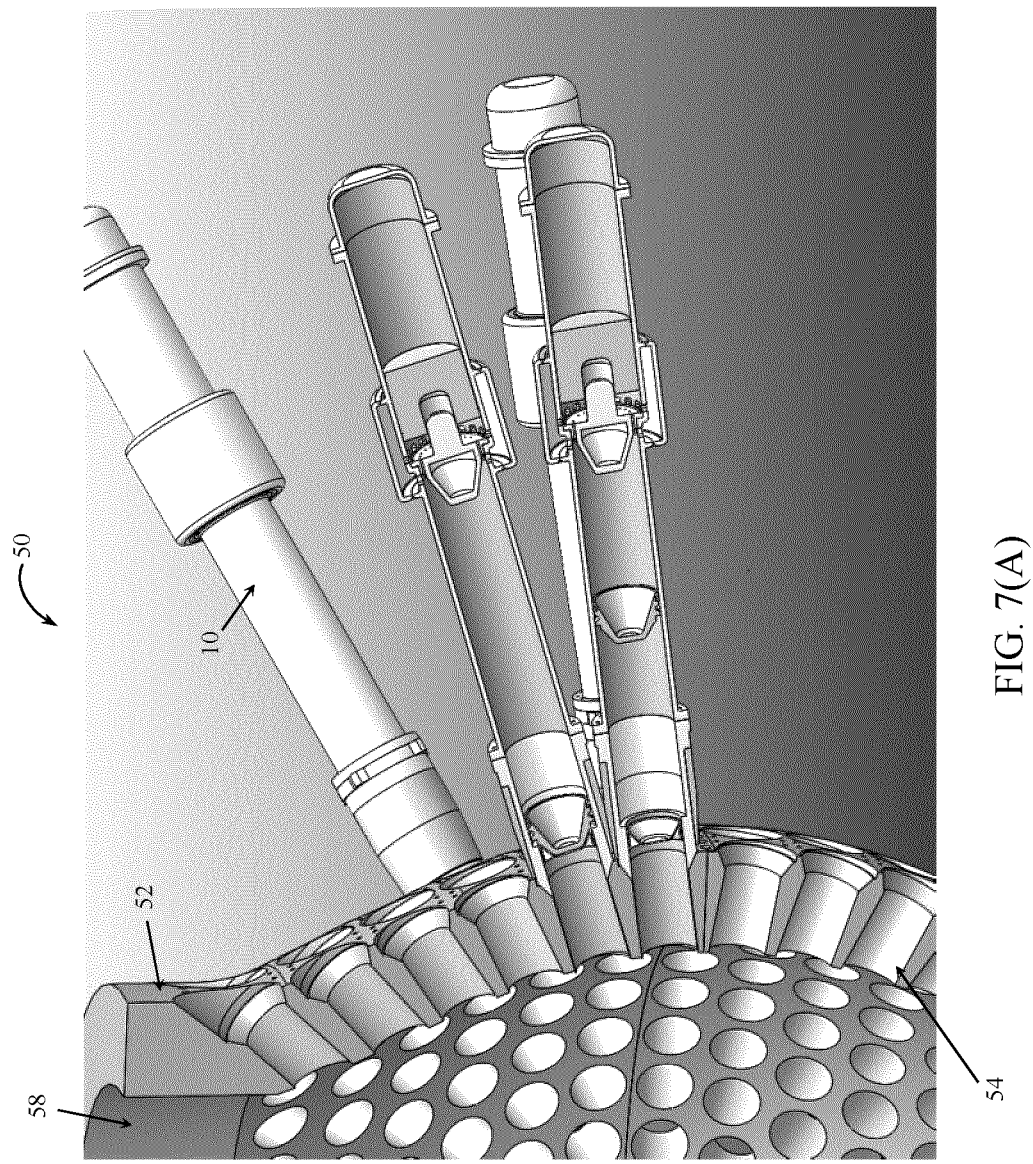
FIGS. 7(A) and (B) are a perspective partial view and a schematic view of a plasma compression system showing multiple plasma compression drivers and a plasma containment vessel containing a liquid liner formed from a liquid medium that is fluidly communicative with the plasma compression drivers.
Figure 7B:
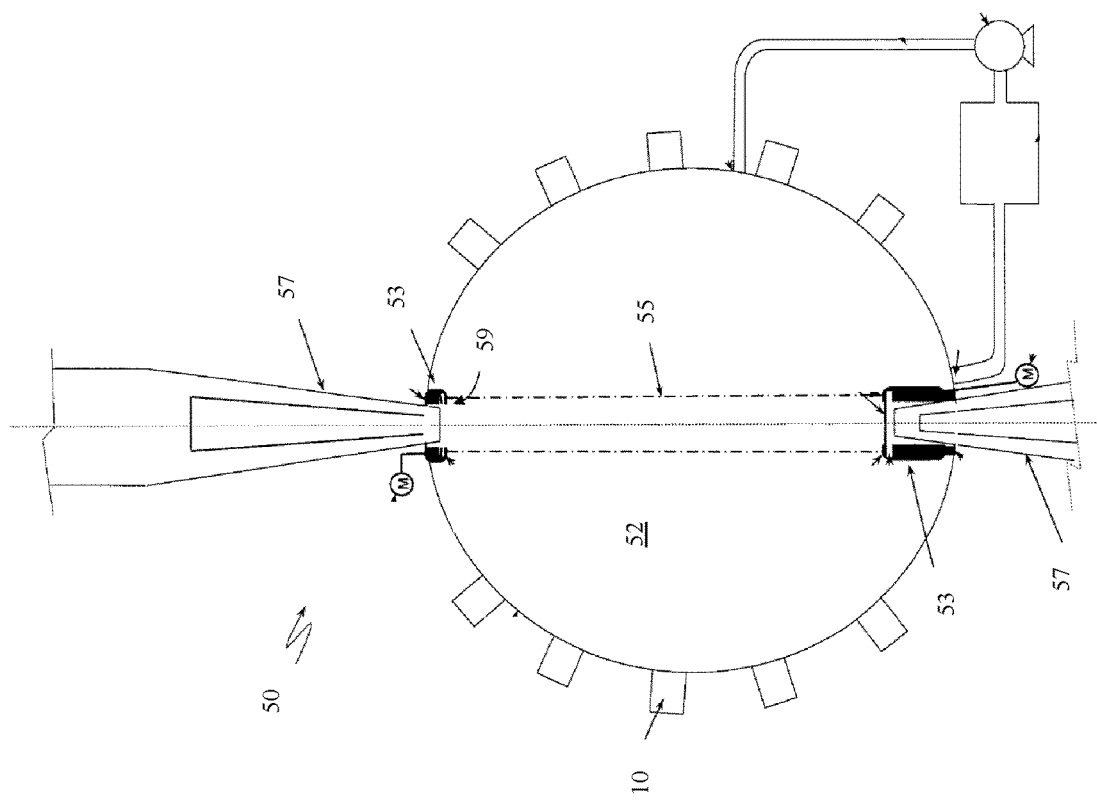

Referring to FIGS. 7(A) and (B), multiple plasma compression drivers 10 can be used in a plasma compression system 50 such as the system developed by General Fusion Inc. This plasma compression system 50 comprises a generally spherical plasma containment vessel 52 that is partially filled with a liquid medium, such as for example a liquid metal. However, the plasma compression drivers can operate with plasma containment vessels having other geometries in other embodiments, such as cylindrical vessels. The liquid medium can be rotated until a liquid liner 55 is formed defining a cavity. A plasma generator 57 generates the plasma which is injected into the cavity. The compression drivers 10 are then operated to push liquid metal into the vessel 52, causing the liquid liner 55 to implode, the cavity to collapse, and the plasma trapped therein to compress.

Figure 1:
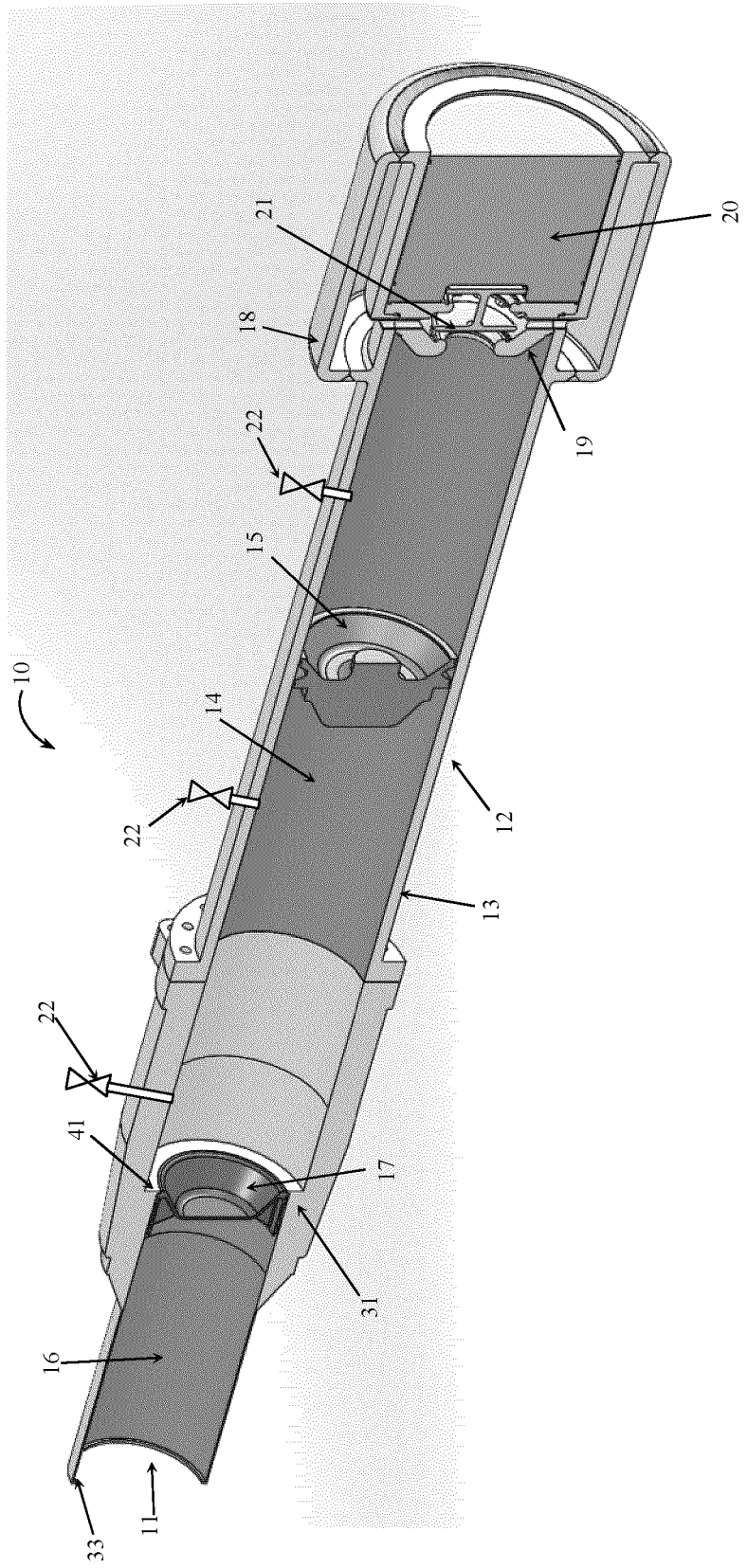
FIG. 1 is a perspective sectioned view of a plasma compression driver according to one embodiment, showing a driver piston, a driver bore, a pusher piston and a pusher bore.

The present description discloses embodiments of a compression driver 10 that can implode a liquid liner with an ability to tune the implosion trajectory. FIG. 1 illustrates one embodiment of a compression driver 10 that comprises a housing 12 with an outer wall 13, a driver bore 14, a driver piston 15 slidably inserted into the driver bore 14, a pusher bore 16 and a pusher piston 17 slidably inserted into the pusher bore 16. The compression driver 10 further comprises a prime mover comprising an accumulator 18 for storing a high pressure fluid ("driver fluid") and a valve 19. The valve 19 controls the flow of the driver fluid from the accumulator 18 to the driver bore 14 behind the driver piston 15. When the valve 19 opens, the driver fluid expands and flows from the accumulator 18 through the valve 19 and to the driver piston 15. The driver fluid can be a pressurized gas such as helium. Alternatively, other gases with a comparably low flow resistance can be used as the driver fluid. The accumulator pressure can be about 20 MPa, in one implementation; however, the accumulator pressure can be different for different implementations, and will depend on factors such as the dimensions and other physical properties of the components of the compression driver 10.

Instead of an accumulator containing a pressurized driver fluid, other prime movers known in the art can be used; for example, the prime mover can comprise a mechanical spring, or an electromagnetic driver.

Figure 2B:
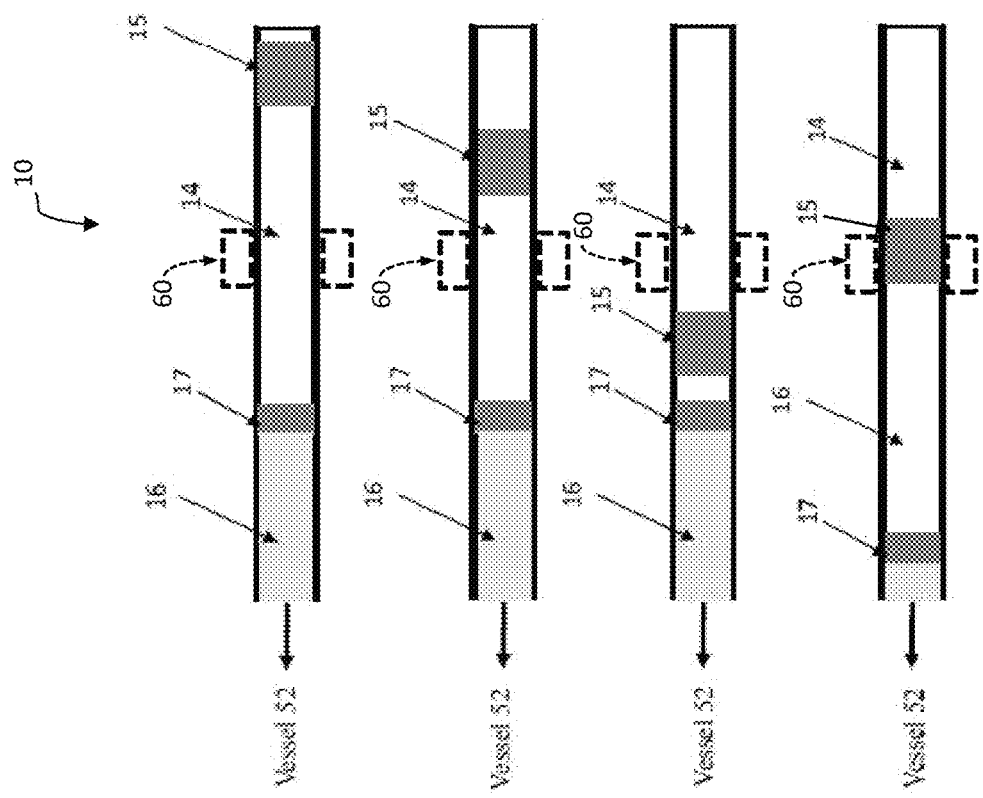
FIG. 2B is a schematic view of the compression driver in operation with a number of coils for generating a magnetic field.
Figure 3:
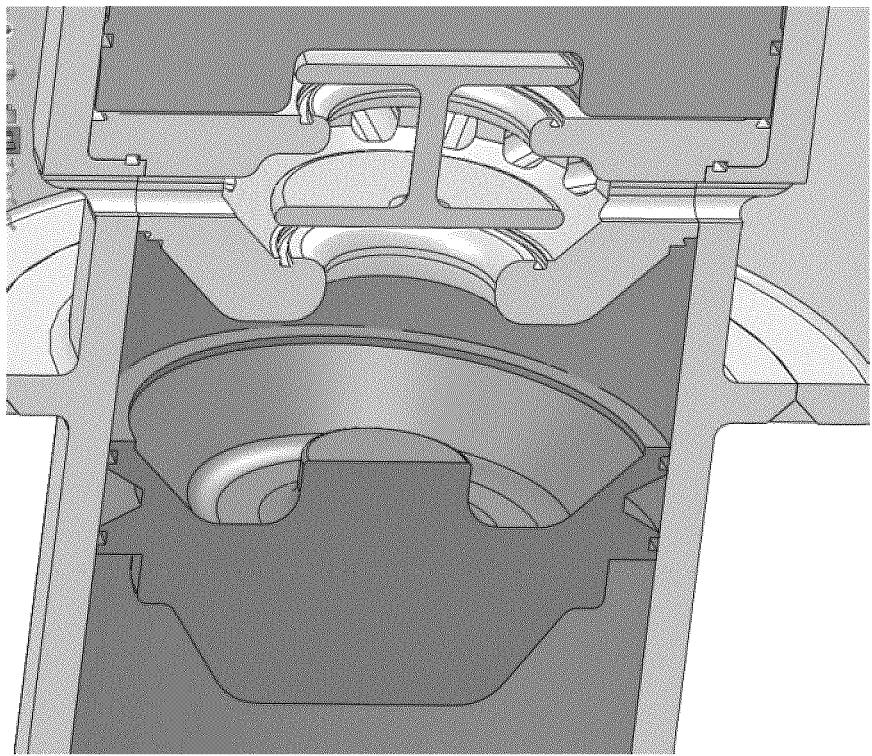
Figure 3:
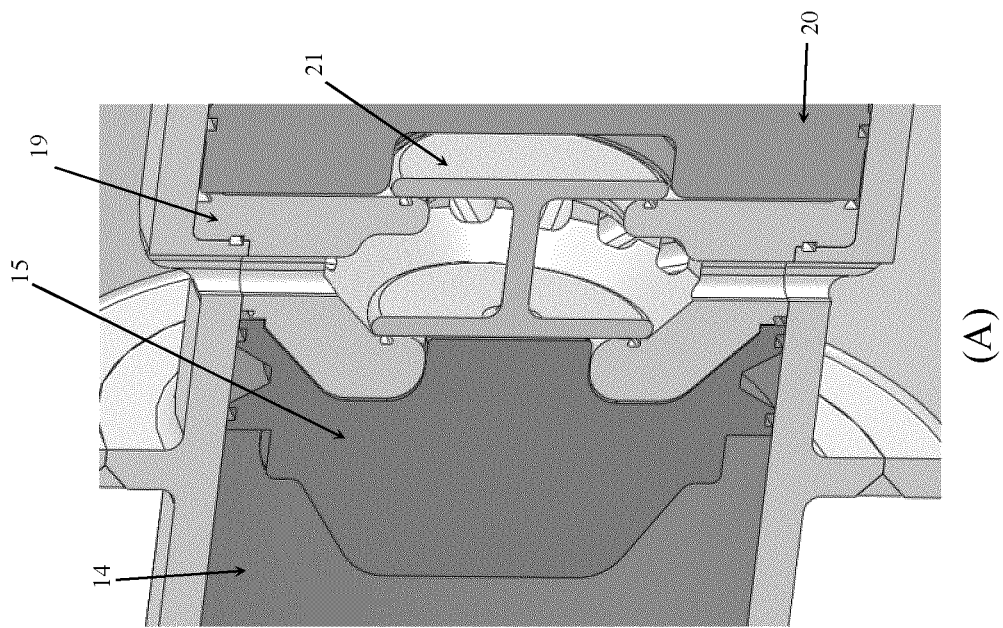

The driver piston 15 resides in the driver bore 14 and has an initial start position that is at the proximal end of the driver bore 14 adjacent to the valve 19 (see FIG. 3(A)). A volume in the driver bore 14 between the driver and the pusher pistons 15, 17 contains a low pressure compressible fluid ("compression fluid"). For the purpose of this application, a compressible fluid can mean any fluid that can be compressed. For example, in one implementation the compression fluid can be a gas such as helium. In another implementation, the compression fluid can be a mixture of a gas and a liquid, as long as the compression fluid mixture in the bore 14 between the pistons 15 and 17 is compressible. In another embodiment, the compressible fluid is replaced with a compressible magnetic field. In this alternative embodiment, a number of coils 60 (see FIG. 2B) can be used to generate a magnetic field in the bore 14 between pistons 15 and 17, and the pistons 15, 17 are composed of a conductive material facing each other, such as copper. As the driver piston 15 accelerates towards the pusher piston 17 such magnetic field gets compressed. When the driver piston 15 is in the initial start position, the initial pressure of the compression fluid or the magnetic field (between the pistons 15 and 17) is significantly less than the fluid pressure of the driver fluid. For example, in one implementation the pressure of the compression fluid is about 0.7 MPa; however the pressure can be different as long as it is significantly lower that the fluid pressure of the accumulator 18.

The driver and pusher bores 14, 16 connect at a bore junction 31. The pusher bore 16 has a smaller diameter than the diameter of the driver bore 14; an annular face surface 41 at the proximal end of the pusher bore 16 faces the distal end of the driver bore 14 at the junction 31. The pusher piston 17 has an initial start position at the bore junction 31, i.e. at the proximal end of the pusher bore 16. The pusher bore 16 has a distal end 11 open to the vessel 52. An outer (distal) face of the pusher piston 17 is in fluid contact with a liquid medium (not shown) in the pusher bore 16; the liquid medium has a higher pressure than the compression fluid when the driver piston 15 is at the initial start position; this initial pressure differential ensures that the pusher piston 17 remains in the initial start position. Alternatively, a mechanical, hydraulic or gaseous pressure means (not shown) can be applied to the pusher piston 17 to keep it in its initial start position.

The pusher piston 17 separates the compression fluid in the driver bore 14 (between the pistons 15 and 17) from the liquid medium in the pusher bore 16. A retaining means, such as for example a ledge 33, is located at the open end 11 of the pusher bore 16 to prevent the pusher piston 17 from being dislodged out of the pusher bore 16. In addition, an additional retaining means 35 (see FIG. 4(A)) can be provided at the proximal end 31 in order to prevent the pusher piston 17 from being pushed into the driver bore 14 due to the pressure applied from the liquid medium in the pusher bore 16.

The driver and pusher pistons 15, 17 can be composed of a stainless steel or a titanium or another comparable material that does not react with the liquid medium, the driver fluid, and the compression fluid. The valve 19 in this embodiment is a poppet/slider 21 and a driver; however, other comparably fast acting valves can be used in other embodiments, such as a gas driven valve or an electromagnetic valve. In one implementation, the compression driver 10 can further comprise a third piston 20 ("recoil piston") that is configured to reduce the recoil of the driver 10. The recoil piston has a mass that significantly higher than the driver piston and can be connected to the driver bore by a damper or spring (not shown). More particularly, the recoil piston 20 is positioned near the valve 19 on the opposite side from the driver piston 15 such that when the valve 19 opens, the driver piston 15 is driven down the driver bore 14 while the recoil piston 20 is driven in an opposite direction; because the recoil piston is heavier than the driver piston, it will accelerate more slowly than the driver piston and reach a lower peak velocity during the compression operation. In other words, the large mass of the third piston serves to slow and lengthen the recoil pulse. The valve 19 size and driver fluid pressure are selected to allow a sufficient flow rate of the driver fluid through the valve 19 to accelerate the driver piston 15 along the driver bore 14 to the junction 31 within a target time period. For example, the valve size and driver fluid pressure can be selected to provide enough pressure to accelerate a 60 kg piston along a 2 m long bore in about 15 ms.

Figure 2A:
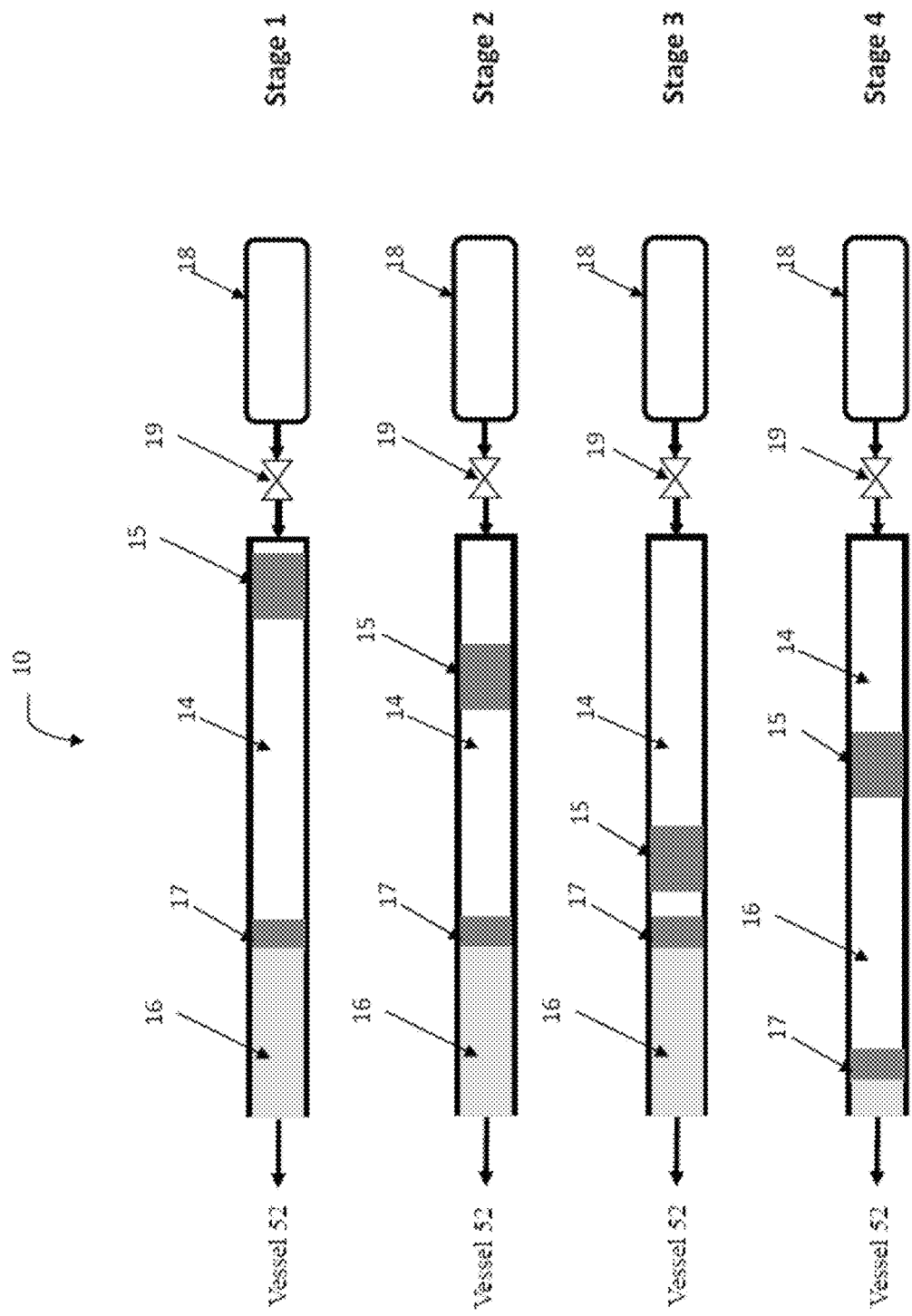
FIG. 2A is a schematic view of the compression driver in operation, showing a position of the driver piston and the pusher piston during four (4) stages of operation.

FIG. 2A schematically shows a compression operation of the compression driver 10, and in particular shows a trajectory and position of the driver and pusher pistons 15, 17 during four stages of the compression operation. Stage 1 is the initial (start) stage before the compression driver 10 is triggered. In this stage the accumulator 18 is fully charged, the valve 19 is closed and the pistons 15, 17 are in their initial positions. In stage 2, the valve 19 is opened and the driver fluid in the accumulator 18 passes through the valve 19 and enters the driver bore 14 behind the driver piston 15, accelerating the driver piston 15 down the bore 14 toward the pusher piston 17 and compressing the compression fluid. During this stage, the pressure of the compression fluid is rising but has not yet exceeded the fluid pressure on the pusher piston 17 caused by the liquid medium and thus the pusher piston 17 has not yet moved significantly. At Stage 3, the driver piston 15 has reached the junction 31 and the compression fluid is at a maximum pressure, which is applied to the pusher piston 17 and the annular face surface 41. At this stage, the compression fluid pressure exceeds the pressure of the liquid medium in the pusher bore 16 and the pusher piston 17 is moved. In Stage 4 the pusher piston 17 accelerates rapidly, pushing the liquid medium out of the pusher bore 16 and into the vessel 52.

Because the driver bore 14 has a larger diameter than the pusher bore 16, it follows that the driver piston 15 has a larger diameter than the pusher piston 17. Additionally, the driver piston 15 is heavier than the pusher piston 17, and the length of the driver bore 14 is longer than a length of the pusher bore 16 in this embodiment. Assuming substantially all the energy is transferred from the driver piston 15 to the pusher piston 17, it is expected that the power applied by the pusher piston 16 on the liquid medium to be higher than the power applied by the driver piston 14 on the compression fluid. In other words, the two-piston design of the compression driver 10 serves to amplify the power delivered by the pusher piston 17 against the liquid medium. Such power amplification contributes to reducing the time period for the compression operation for a given amount of energy, e.g. the energy required to compress the plasma within a target time period.

FIG. 3(A) illustrates the driver piston 15 in its initial position when the valve 19 is closed and the poppet 21 sits on its seat closing the outlet. The valve 19 can be an electromagnetic valve such that when an electric pulse is provided to a coil (not shown) the poppet 21 is driven away from its seat (see FIG. 3(B)). When the valve 19 opens the driver fluid from the accumulator flows into the driver bore 14 between the driver piston 15 and third piston 20, and the driver fluid pressure accelerates the driver piston 15 down the driver bore 14 and pushes the third piston 20 (partially shown in FIGS. 3(A) and 3(B)) in an opposite direction.

During operation, the acceleration profile of the driver piston 15 can be controlled by controlling the pressure of the driver fluid in the driver bore 14 behind the driver piston 15. The acceleration profile of the driver piston 15 can be adjusted by adjusting the driver fluid pressure behind (upstream) the driver piston 15 (pressure of the accumulator 18). For example, the driver fluid pressure on the driver piston can be adjusted by adjusting the valve 19 opening size or duration to control the driver fluid flow from the accumulator and/or venting driver fluid from the driver bore 14 via ports 22 in the driver bore 14 behind the driver piston 15; these ports 22 can have controllable valves (not shown) similar to driver fluid valve 19. The acceleration profile of the driver piston 15 can also be controlled by controlling the pressure of the compression fluid in front (downstream) of the driver piston 15. Ports 22 (see FIG. 1) in the wall 13 of the housing 12 between the driver and pusher pistons 15, 17 can be controlled to inject or vent the compression fluid. In addition, additional compressible fluid can be injected near the proximal end of the driver bore 14 to slow down the driver piston 15 to prevent impact with the pusher piston 17. The length of the driver bore 14 can be designed to be long enough so that the trajectory of the driver piston 15 can be tuned by changing the pressure of the driver fluid and/or the pressure of the compression fluid. A number of sensors (not shown) can be provided to measure the position of the driver piston 15 and provide the measured signals to a controller (not shown).

Figure 4A:
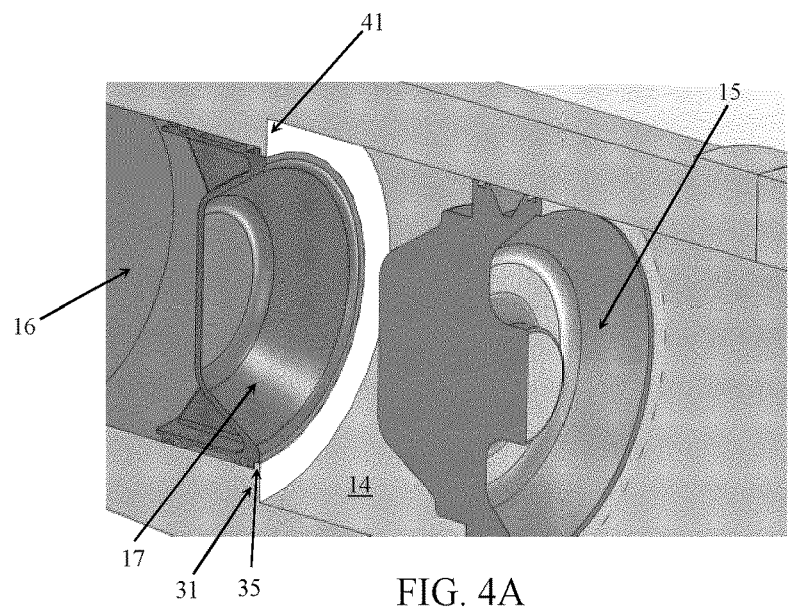
Figure 4B:
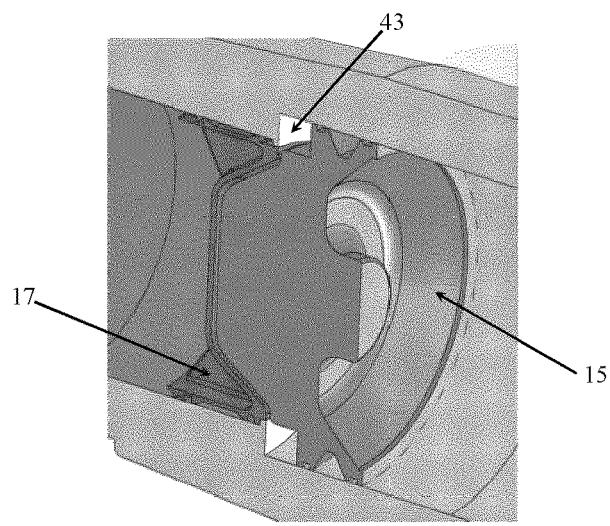
Figure 4C:
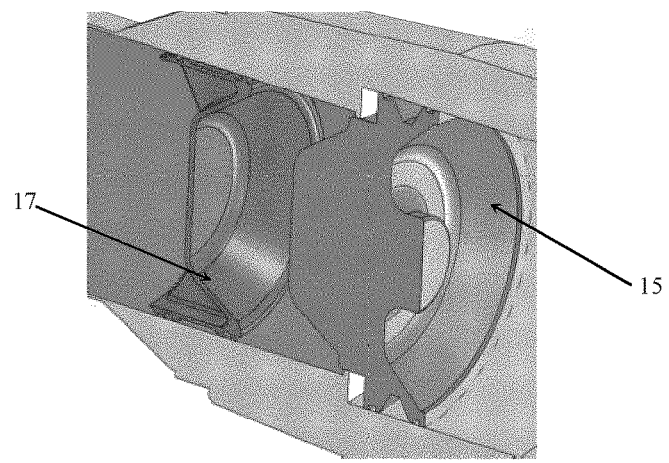

Referring to FIGS. 4(A)-(C), the driver and pusher bores 14, 16 are connected at the junction 31 by the annular face surface 41. As can be seen particularly in FIGS. 4(B) and (C), the driver piston 15 has a distal end designed to cooperate with the annular face surface 41 to define an annular channel 43 when the driver piston 15 is at the junction 31, wherein the compression fluid is highly compressed. The high pressure of the compression fluid in the channel 43 serves to slow down the driver piston 15 and prevent the impact with the annular face surface 41 and/or the pusher piston 17. Additionally and as previously noted, the compression fluid applies an inward force on the annular face surface 41; in other words, the annular face surface 41 applies an inward force on the vessel and serves as a pressure balancing lip such that the pressure pulse generated by the driver piston 15 will offset or reduce the pressure pulse generated by the pusher piston 17 pushing on the fluid in the pusher bore 16 and thus will reduce (minimize) the stress imparted by the compression driver 10 on the vessel (or any other structure to which the driver is connected).

Figure 5:
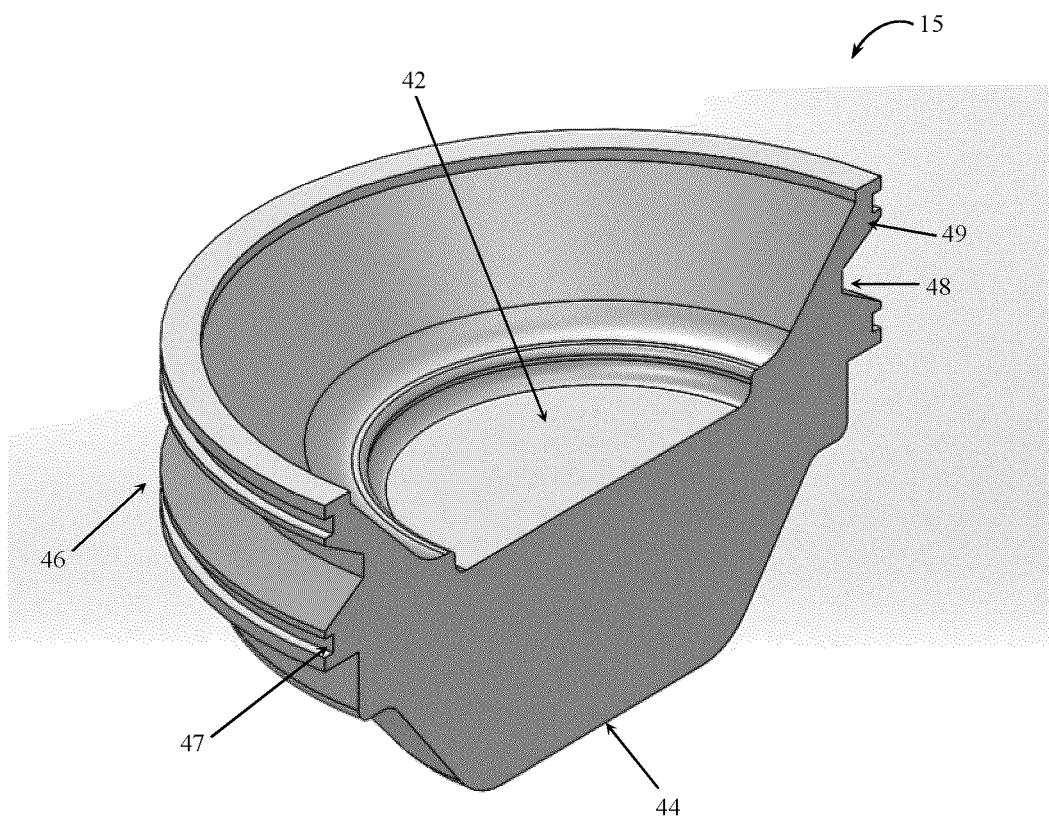
FIG. 5 is a perspective sectioned view of the driver piston.

FIG. 5 illustrates an embodiment of the driver piston 15. The driver piston 15 has a generally frusto-conical shape with a front wall 44, a back wall 42 and a side wall 46. The front wall 44 is the surface of the piston 15 that faces the pusher piston 17 while the back wall 42 is the surface that faces the valve 19 and upon which the driver fluid from the accumulator 18 pushes onto. An annular channel 48 is formed around the periphery of the side wall 46 to reduce the weight of the piston 15. A number of seal seats 47, 49 are formed in the side wall 46 to house a number of seals (not shown). In some implementations, the seal seats 47 and the corresponding seals can be omitted. Alternatively, the driver piston 15 can have a different geometry provided the piston holds pressure in the bores 14, 16 and does not impact the pusher piston 17.

Figure 6:
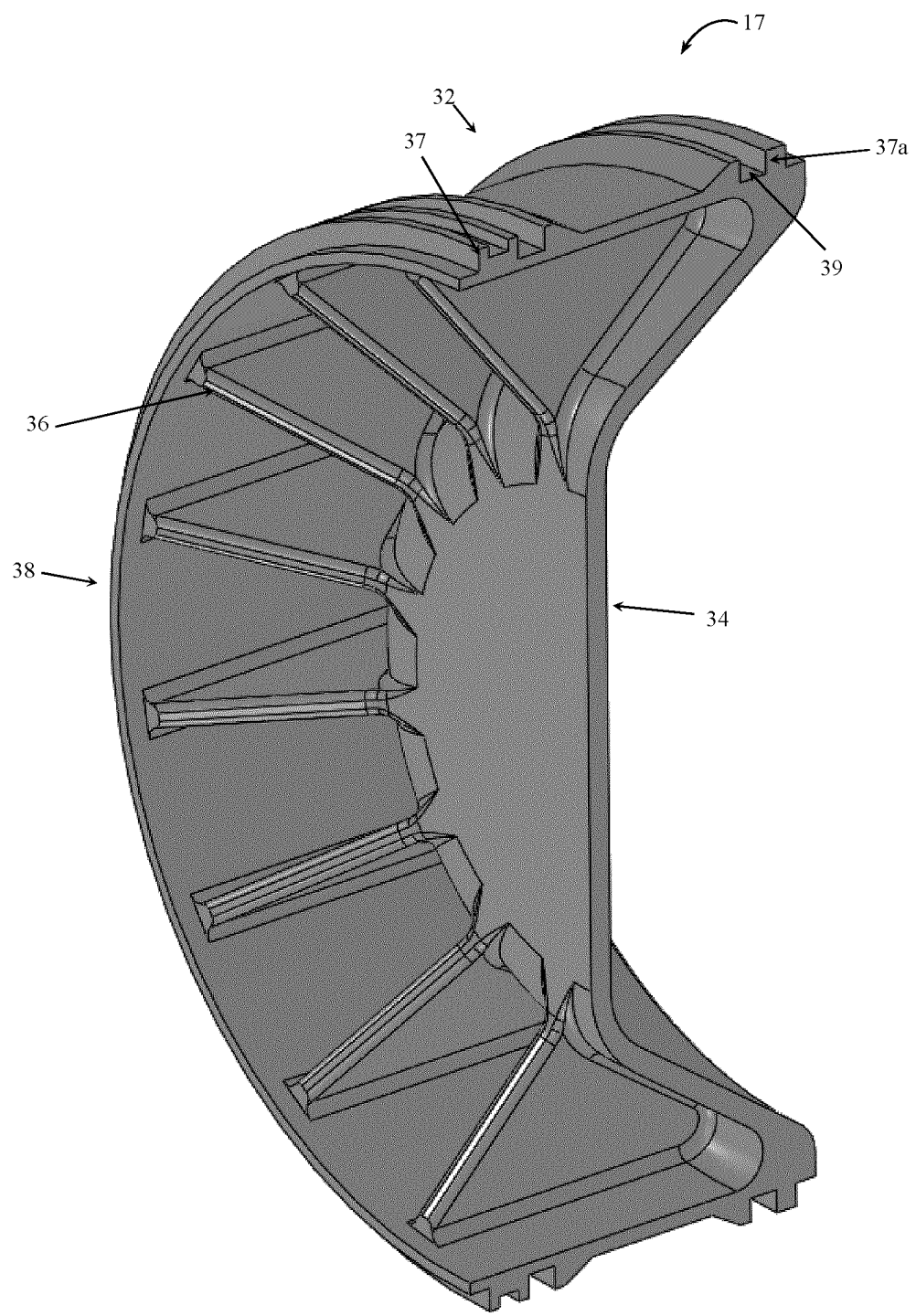
FIG. 6 is a perspective sectioned view of the pusher piston.

FIG. 6 shows an embodiment of the pusher piston 17. The pusher piston 17 has a frusto-conically shaped inner wall 34, an outer wall 38 and a side wall 32. The inner wall 34 of the pusher piston 17 faces the front wall 44 of the driver piston 15, as can be seen in FIGS. 4(A)-(C). The driver and the pusher pistons 15 and 17 are shaped so that the front wall 44 of the driver piston 15 can approach close to the inner wall 34 of the pusher piston 17 and concentrate the compressible fluid between their conical portions. The shape of the pistons 15, 17, makes the pistons lighter thus reducing the weight of the compression driver 10. The pusher piston 17 can further comprise a plurality of gussets 36 formed at the outer wall 38 of the pusher piston 17. The gussets 36 are configured to increase the stiffness of the pusher piston 17. In one alternative embodiment (not shown), the outer wall 38 can be a solid plate that encloses the gussets 36 such that the gussets are not in contact with the liquid medium contained in the pusher bore 16. Persons skilled in the art would understand that the gussets 36 can be omitted and the stiffness of the pusher piston 17 can be increased by using a material that can provide the desire stiffness (and lightness) or by adding different features other than the gussets without departing from the scope of the invention. The pusher piston 17 further comprises a pair of seal seats 39 for containing seals (not shown). A protruding ledge 37 extends outwardly from an outer surface of the side wall 32. The protruding ledge 37 cooperates with the ledge 33 (see FIG. 1) formed at the open end 11 of the pusher bore 16 to prevent the pusher piston 17 from being dislodged out of the bore 16. Additionally, liquid medium that gets trapped in a space between the two ledges 33, 37 as the pusher piston 17 approaches the open end 11, creates resistance by the liquid having to divert around the ledges 33, 37 and thus contributes to decelerating the piston 17 and preventing damage to the piston 17 and/or the bore 16. In addition the pusher piston 17 can further comprise a ledge 37a formed near the inner wall 34 that can interact with the ledge 35 formed at the proximal end 31 of the pusher bore 16 to prevent the pusher piston 17 from being pushed into the driver bore 14. Alternatively, other configuration of retaining means readily apparent to one skilled in the art can be used to prevent the pusher piston 17 from being dislodged out of the pusher bore 16 or pushed into the driver bore 14.

Figure 8:
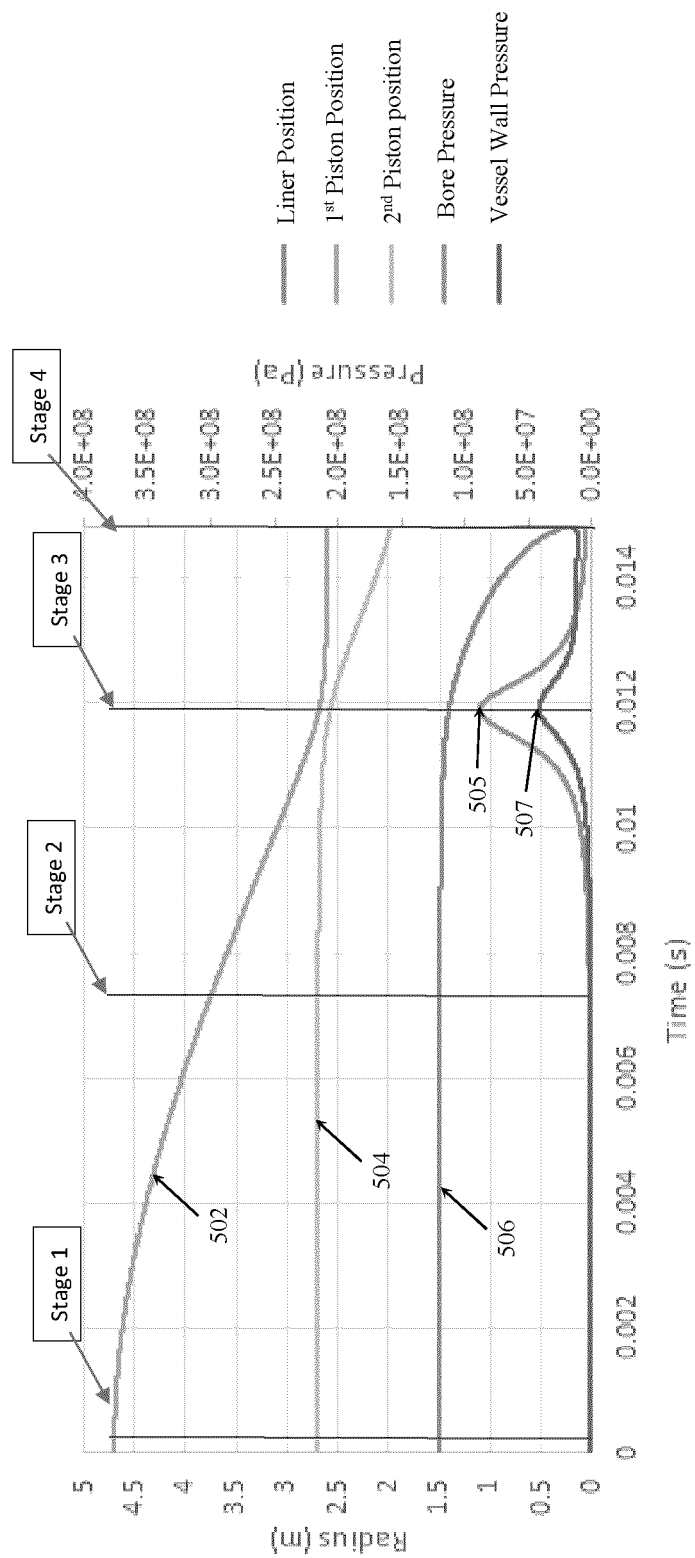
FIG. 8 is a graph of the positions of the driver and pusher pistons and the liquid liner during a driver compression operation, and of the pressures of the driver bore and the vessel during the driver compression operation.

FIG. 8 graphically illustrates a pressure pulse at a driver's bore and a vessel wall during the compression operation as well as a position trajectory over time of the driver piston, the pusher piston and a liner interface, for one exemplary embodiment. The curves illustrated in FIG. 8 are as an example of a compression driver of this exemplary embodiment that has a driver piston with a mass of about 55 kg, a driver bore with a length of about 2 m and a diameter of about 340 mm, a pusher piston with a mass of about 10 kg, a length of about 0.6 m; and a bore diameter of about 290 mm. A 50 L accumulator containing driver fluid at a pressure of 20 MPa is provided to accelerate the driver piston. The initial pressure of the compressible fluid in the driver bore between the two pistons is about 0.7 MPa. The compression driver is used to implode a liquid liner to collapse a spherical cavity with radius of about 1.5 m that is formed within the liquid liner. As can be noticed by the graph, the pusher piston and the liquid liner (see respective curves 504 and 506) accelerate only when the driver piston (curve 502) is near the pusher piston (end of $2^{nd}$ stage). Peak inward pressure on an annular face surface at the junction of the driver and pusher bores and a peak outward pressure at the wall of the vessel 507 occur at the same time (i.e. when the pusher piston is accelerated), thus counteracting each other, and reducing the overall stress on the vessel wall caused by the compression operation.

In one mode of operation of the compression driver 10, a plurality of the compression drivers 10 can be used in a plasma compression system 50 illustrated in FIGS. 7(A) and (B). The plasma compression system 50 comprises the vessel 52 that can be partially filled with the liquid medium. A liquid rotation/circulating mechanism 53 is provided to rotate the liquid medium flowing in the vessel 52 such that the liquid medium is pushed into the pusher bore 16 of the driver 10 through the open end 11. The rotation of the liquid medium in the vessel 52 also forms a liquid liner 55 in the vessel 52 with a rotating inner interface that defines an evacuated cavity formed within the liner 55. The vessel 52 has a wall with a plurality of openings forming ports 54 that extend through the wall. A plurality of compression drivers 10 are mounted to the wall of the vessel 52 and are arranged at the periphery of the vessel 52, such that the pusher bore 16 of the driver 10 extends along the port 54. For example, the pusher bore 16 of the driver 10 can be inserted into the port 54, such that the opened end 11 of the pusher bore 16 is aligned with the inner surface of the vessel 52. A plasma generator 57 can generate the plasma. The plasma generator 57 has an outlet (not shown) that is connected to an inlet opening 59 formed in the wall of the vessel 52. The evacuated cavity formed within the liquid liner has an entrance opening 59 that is aligned with the outlet of the plasma generator 57 such that the generated plasma is injected into the cavity. The liquid liner 55 in the vessel 52 and the liquid medium in the pusher bore 16 are in fluid communication, such that when the liquid medium in the pusher bore 16 is displaced out of the pusher bore 16 due to the acceleration of the pusher piston 17 (as described herein above) it will implode the liquid liner 55 inwardly collapsing the cavity and compressing the plasma trapped therein. A controller (not shown) can be provided to receive and process the signals obtained from the sensors of each of the drivers 10 and provide an output to a number of valves to tune the position of the driver piston 15 of such drivers 10 and thus tune the acceleration profile of the pusher pistons 17 and therefore control the trajectory of liquid liner implosion. The tuning of the acceleration profile of the driver piston 15 can be done by adjusting the pressure behind the driver piston 15 (pressure of the accumulator) and/or by adjusting the pressure of the compressible fluid between the driver and the pusher pistons 15, 17 during the compression operation. For example, more fluid can be added behind the driver piston 15 to accelerate it or some fluid can be vented to decelerate the piston 15, and thus adjust the acceleration profile of the driver piston 15 and consequently the acceleration profile of the pusher piston 17.

Figure 9A:
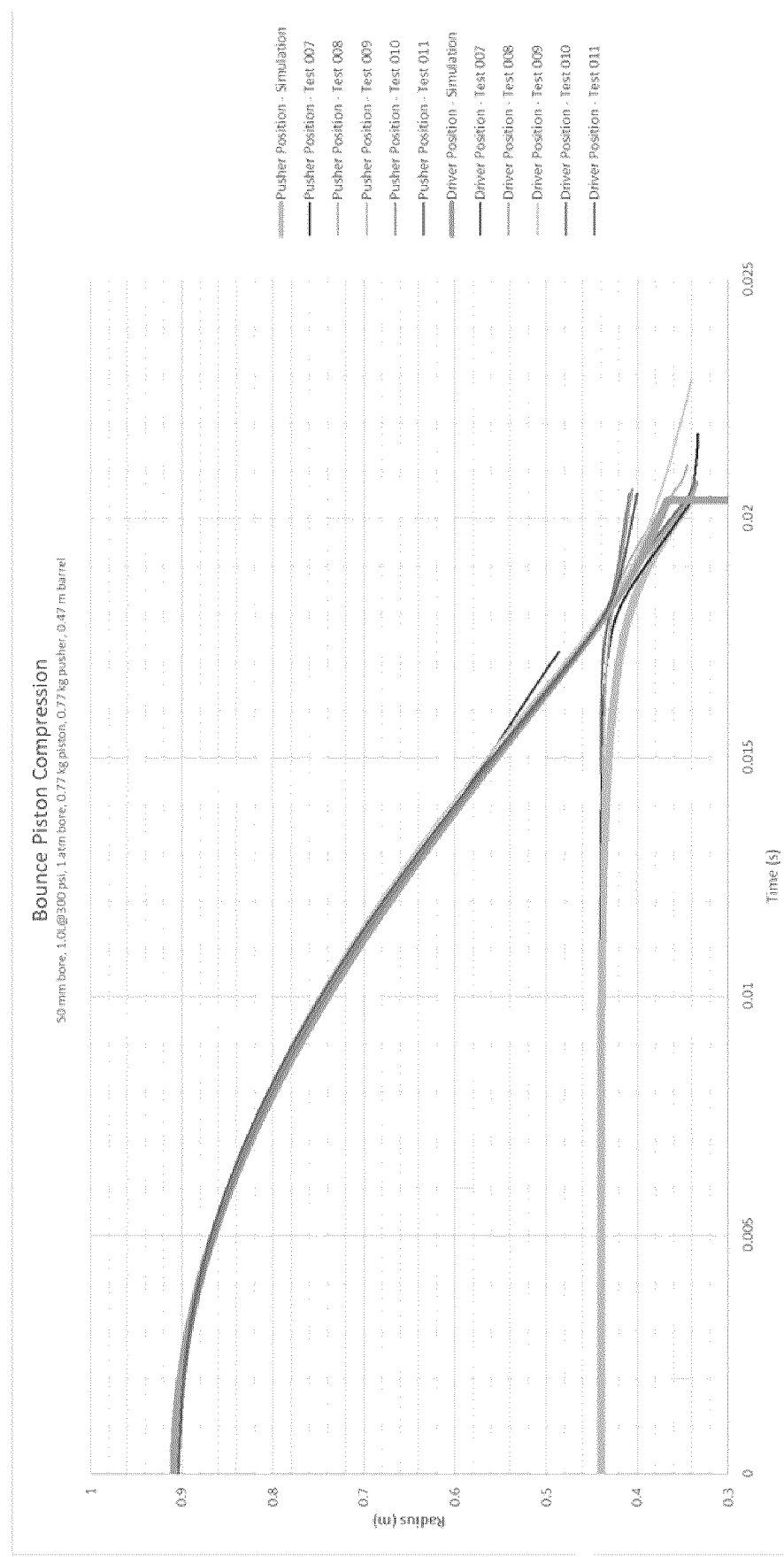
FIGS. 9A and 9B are graphical presentations of experimental results of a driver compression operation, showing position trajectories of a driver piston and a pusher piston.
Figure 9B:
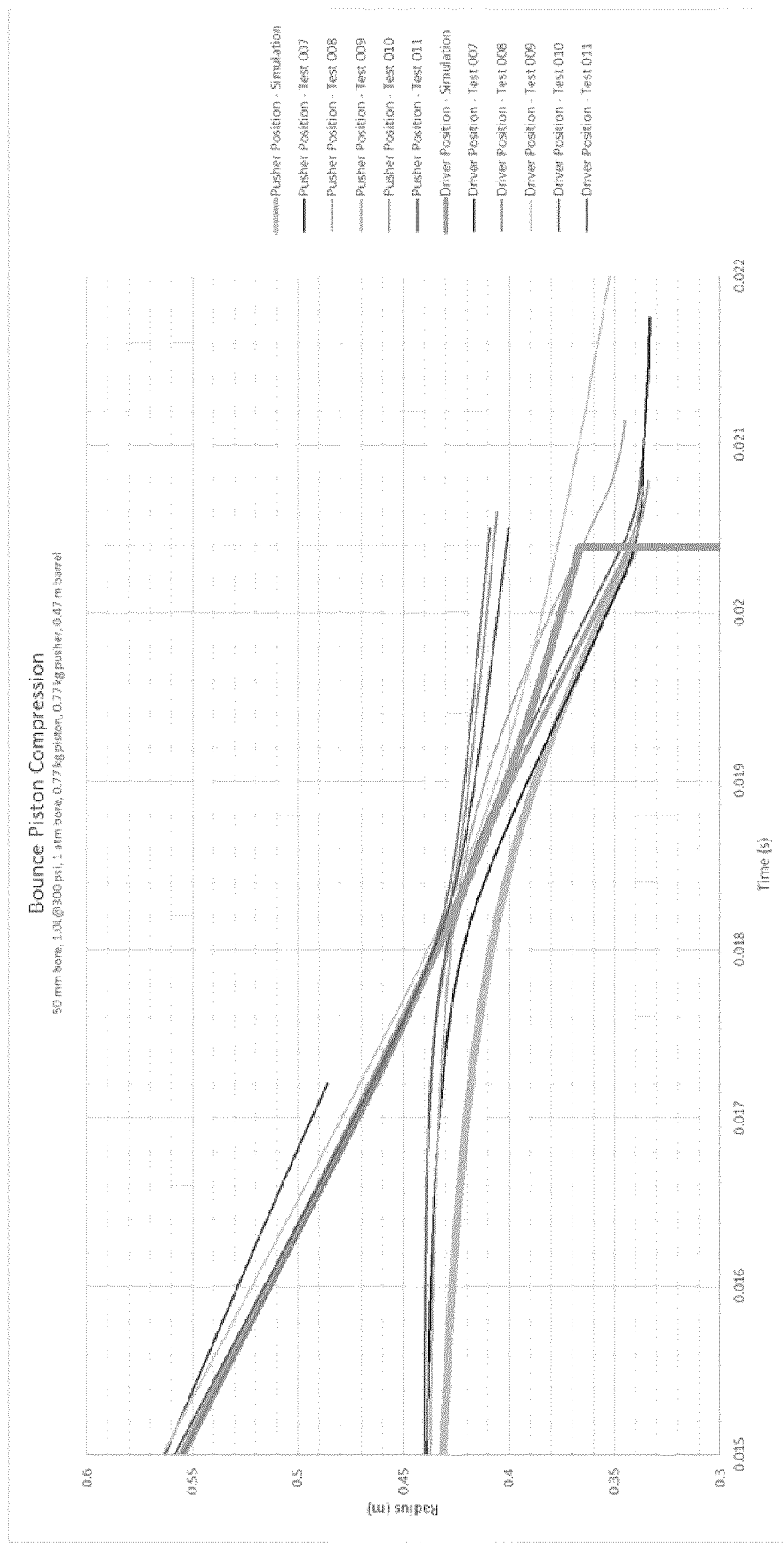

An experimental embodiment of the compression driver 10 has been tested at General Fusion Inc. and the results from the experiments were compared with the theoretical predictions. The results from the experiments and computer simulated model are graphically illustrated in FIGS. 9(A) and 9(B). The experiments were done with a compression driver with 0.77 kg driver piston, 0.77 kg pusher piston and a 0.47 m long 44 mm diameter driver bore. A 1.1 L accumulator with 2 MPa pressure was provided to accelerate the driver piston and the initial pressure of the compressible fluid in the driver bore between the two pistons was about 0.1 MPa. Results from five (5) experiments were compared with results obtained from a computer model simulating the same conditions. FIG. 9(A) shows full lengths of the experiments while the graph in FIG. 9(B) focuses on the time around stage 3. While there is a degree of variation between the tests it is clear to see that there is a correlation between the simulation and the experimental results.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. A plasma compression system comprising:
   a plasma containment vessel comprising a liquid medium which circulates within the vessel during operation and forms a liquid liner with a cavity;
   a plasma generator fluidly communicative with the vessel and operable to inject a plasma into the cavity; and
   a compression driver connected to the vessel and comprising:
     a driver bore with a driver piston slideable therein;
     a pusher bore with a pusher piston slideable therein and having a mass lower than a mass of the driver piston, the pusher bore having a distal end in fluid communication with the liquid medium, a proximal end coupled to a distal end of the driver bore at a bore junction, and a length shorter than a length of the driver bore; and
     a compressible compression fluid in between the driver and pusher pistons, wherein compression of the compression fluid by the driver piston moving towards the pusher piston applies pressure on the pusher piston, such that the pusher piston pushes the liquid medium into the vessel to collapse the liquid liner and compress the plasma.

2. The plasma compression system as claimed in claim 1 wherein the pusher bore has a diameter that is smaller than a diameter of the driver bore, and the compression driver further comprises an annular face surface interconnecting a proximal end of the pusher bore and the distal end of the driver bore at the bore junction, and whereby compression of the compression fluid applies a first pressure on the annular face surface which counteracts a second pressure on the vessel.

3. The plasma compression system as claimed in claim 1, further comprising an accumulator containing a pressurized driver fluid and a driver fluid valve fluidly coupling the accumulator to the driver bore, the accumulator operable to move the driver piston along the driver bore.

4. The plasma compression system as claimed in claim 3 wherein the driver fluid valve is adjustable to adjust a pressure applied to the driver piston by the driver fluid.

5. The plasma compression system as claimed in claim 3, further comprising at least one venting port in the driver bore for venting the driver fluid or the compression fluid from the driver bore, the venting port comprising a venting valve adjustable to adjust a pressure applied to the driver piston by the driver fluid or the compression fluid.

6. The plasma compression system as claimed in claim 1, further comprising a compression fluid injection port in the driver bore in proximity to the bore junction and for injecting the compression fluid into the driver bore, the compression fluid injection port comprising a compression fluid injection valve adjustable to adjust a pressure applied to the driver piston by the compression fluid.

7. The plasma compression system as claimed in claim 1, wherein the driver piston has a distal end comprising a frusto-conical protrusion and the pusher piston has a proximal end comprising a frusto-conical receptacle configured to receive the distal end of the driver piston.

8. The plasma compression system as claimed in claim 2, wherein the driver piston comprises a distal end having an annular ledge parallel to the annular face surface and an annular rim perpendicular to and adjacent the annular ledge, such that a compression fluid channel is formed by the annular rim, annular face surface and annular ledge when the driver piston is at the bore junction.

9. The plasma compression system as claimed in claim 1 further comprising a recoil piston movably attached to the proximal end of the driver bore.

10. The plasma compression system as claimed in claim 1, wherein the plasma containment vessel comprises multiple compression drivers connected to the plasma containment vessel.

11. A compression driver for compressing plasma in a cavity defined by a liquid liner composed of a liquid medium contained in a vessel of a plasma compression system, the compression driver comprising:
    a driver bore with a driver piston slideable therein;
    a pusher bore with a pusher piston slideable therein and having a mass lower than a mass of the driver piston, the pusher bore having a distal end for communicating with the liquid medium in the vessel, a proximal end coupled to a distal end of the driver bore at a bore junction, and a length shorter than a length of the driver bore; and
    a compressible compression fluid in between the driver and pusher pistons, wherein compression of the compression fluid by the driver piston moving towards the pusher piston applies pressure on the pusher piston, such that the pusher piston pushes the liquid medium into the vessel to collapse the liquid liner and compress the plasma.

12. The compression driver as claimed in claim 11 wherein the pusher bore has a diameter smaller than a diameter of the driver bore, and the compression driver further comprises an annular face surface interconnecting the proximal end of the pusher bore and the distal end of the driver bore at the bore junction, and whereby compression of the compression fluid applies a first pressure on the annular face surface which counteracts a second pressure on the vessel.

13. The compression driver as claimed in claim 11, further comprising an accumulator containing a pressurized driver fluid and a driver fluid valve fluidly coupling the accumulator to the driver bore, the accumulator operable to move the driver piston along the driver bore.

14. The compression driver as claimed in claim 13 wherein the driver fluid valve is adjustable to adjust a pressure applied to the driver piston by the driver fluid.

15. The compression driver as claimed in claim 11, further comprising at least one venting port in the driver bore for venting the driver fluid or the compression fluid from the driver bore, the venting port comprising a venting valve adjustable to adjust a pressure applied to the driver piston by the driver fluid or the compression fluid.

16. The compression driver as claimed in claim 11, further comprising a compression fluid injection port in the driver bore in proximity to the junction and for injecting the compression fluid into the driver bore, the compression fluid injection port comprising a compression fluid injection valve adjustable to adjust a pressure applied to the driver piston by the compression fluid.

17. The compression driver as claimed in claim 11, wherein the driver piston has a distal end comprising a frusto-conical protrusion and the pusher piston has a proximal end comprising a frusto-conical receptacle configured to receive the distal end of the driver piston.

18. The compression driver as claimed in claim 12, wherein the driver piston comprises a distal end having an annular ledge parallel to the annular face surface and an annular rim perpendicular to an adjacent the annular ledge, such that a compression fluid channel is formed by the annular rim, annular face surface and annular ledge when the driver piston is at the bore junction.

19. The compression driver as claimed in claim 11 further comprising a recoil piston movably attached to the proximal end of the driver bore.

20. A plasma compression system comprising:
- a plasma containment vessel comprising a liquid medium which circulates within the vessel during operation and forms a liquid liner with a cavity;
- a plasma generator fluidly communicative with the vessel and operable to inject a plasma into the cavity; and
- a compression driver connected to the vessel and comprising:
    - a driver bore with a driver piston slideable therein;
    - a pusher bore with a pusher piston slideable therein and having a mass lower than a mass of the driver piston, the pusher bore having a distal end in fluid communication with the liquid medium, a proximal end coupled to a distal end of the driver bore at a bore junction, and a length shorter than a length of the driver bore; and
    - a magnetic field in between the driver and pusher pistons, wherein compression of the magnetic field by the driver piston moving towards the pusher piston applies pressure on the pusher piston, such that the pusher piston pushes the liquid medium into the vessel to collapse the liquid liner and compress the plasma.

21. The plasma compression system as claimed in claim 20, further comprising an accumulator containing a pressurized driver fluid and a driver fluid valve fluidly coupling the accumulator to the driver bore, the accumulator operable to move the driver piston along the driver bore.

22. The plasma compression system as claimed in claim 21, wherein the driver fluid valve is adjustable to adjust a pressure applied to the driver piston by the driver fluid.

23. The plasma compression system as claimed in claim 20, wherein the driver piston has a distal end comprising a frusto-conical protrusion and the pusher piston has a proximal end comprising a frusto-conical receptacle configured to receive the distal end of the driver piston.

24. The plasma compression system as claimed in claim 20, further comprising a recoil piston movably attached to the proximal end of the driver bore.

25. The plasma compression system as claimed in claim 20, wherein the plasma containment vessel comprises multiple compression drivers connected to the plasma containment vessel.

26. A compression driver for compressing plasma in a cavity defined by a liquid liner composed of a liquid medium contained in a vessel of a plasma compression system, the compression driver comprising:
- a driver bore with a driver piston slideable therein;
- a pusher bore with a pusher piston slideable therein and having a mass lower than a mass of the driver piston, the pusher bore having a distal end for communicating with the liquid medium in the vessel, a proximal end coupled to a distal end of the driver bore at a bore junction, and a length shorter than a length of the driver bore; and
- a magnetic field in between the driver and pusher pistons, wherein compression of the magnetic field by the driver piston moving towards the pusher piston applies pressure on the pusher piston, such that the pusher piston pushes the liquid medium into the vessel to collapse the liquid liner and compress the plasma.

27. The compression driver as claimed in claim 26, further comprising an accumulator containing a pressurized driver fluid and a driver fluid valve fluidly coupling the accumulator to the driver bore, the accumulator operable to move the driver piston along the driver bore.

28. The compression driver as claimed in claim 27, wherein the driver fluid valve is adjustable to adjust a pressure applied to the driver piston by the driver fluid.

29. The compression driver as claimed in claim 26, wherein the driver piston has a distal end comprising a frusto-conical protrusion and the pusher piston has a proximal end comprising a frusto-conical receptacle configured to receive the distal end of the driver piston.

30. The compression driver as claimed in claim 26, further comprising a recoil piston movably attached to the proximal end of the driver bore.

* * * * *